United States Patent [19]

Fink, Jr.

[11] Patent Number: 4,828,183

[45] Date of Patent: * May 9, 1989

[54] BUTTERFLY VALVE FOR FLUID FLOW LINE

[75] Inventor: Arthur C. Fink, Jr., Lonedell, Mo.

[73] Assignee: Husky Corporation, Pacific, Mo.

[*] Notice: The portion of the term of this patent subsequent to May 26, 2004 has been disclaimed.

[21] Appl. No.: 53,401

[22] Filed: May 22, 1987

Related U.S. Application Data

[63] Continuation-in-part of Ser. No. 682,661, Dec. 17, 1984, Pat. No. 4,667,883.

[51] Int. Cl.⁴ .................. B05B 1/30; B65B 31/00; B65B 57/14; F16K 57/14

[52] U.S. Cl. ..................... 239/569; 141/59; 141/290; 137/68.1; 137/69

[58] Field of Search ............... 239/569; 251/215, 279, 251/305; 137/527, 527.4, 614, 68.1, 69; 141/290, 59

[56] References Cited

U.S. PATENT DOCUMENTS

| | | | |
|---|---|---|---|
| 3,915,206 | 10/1975 | Fowler et al. | 141/59 |
| 4,090,539 | 5/1978 | Krupp | 141/290 X |
| 4,167,958 | 9/1979 | Voelz | 141/290 X |
| 4,361,165 | 11/1982 | Flory | 137/68.1 X |
| 4,625,746 | 12/1986 | Calvin et al. | 137/68.1 |
| 4,667,883 | 5/1987 | Fink | 239/569 |
| 4,687,033 | 8/1987 | Furrow et al. | 141/59 |

Primary Examiner—Andres Kashnikow
Assistant Examiner—Patrick N. Burkhart
Attorney, Agent, or Firm—Paul M. Denk

[57] ABSTRACT

A butterfly valve provided within a disconnect of a fluid flow line, such as in a fuel dispensing system, incorporating a pair of decoupling members, at least one or a pair of butterfly valves mounted within and in proximity with location for disconnection of the conduit, the butterfly valve incorporating a valve disk held by a retainer and which is spring biased for snapping into closure against its valve seat, when disconnection occurs, to prevent the further flow of fuel from the conduit, or in the instance where a pair of the butterfly valves of this design, are incorporated proximate each of the disconnect members, upon severance of the conduit or hose at this location, effecting an immediate closure of both butterfly valves, preventing the discharge of any further fluid from the remaining separated parts of the fluid conduit. The specific construction of each butterfly valve incorporates a set of projections that normally mount upon shoulders of the valve retainer, and upon release, and pivoting of the disk towards closure, the projections ride within formed grooves for guiding the valve disk into a fluidic seal against a conveniently disposed valve seat, and said projections further facilitating the reopening of the butterfly valve upon flow of the fluid in an opposite direction. A vapor recovery conduit arranged generally in proximity with, or concentrically around, the fluid flow line to provide for passage of fluid vapors therethrough during functioning of the fuel dispensing system.

17 Claims, 6 Drawing Sheets

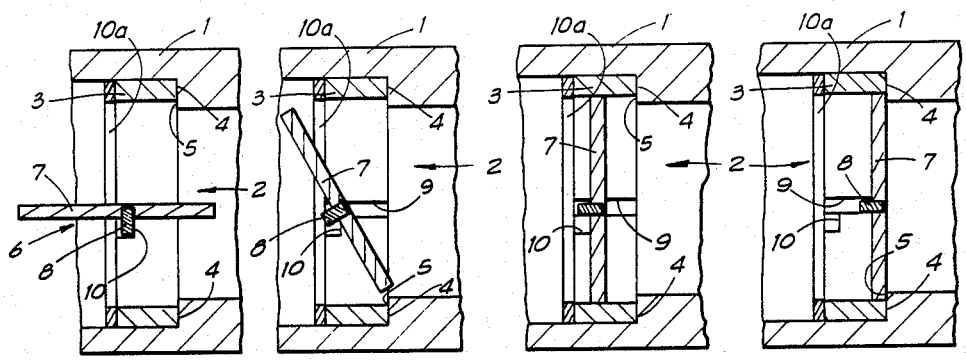
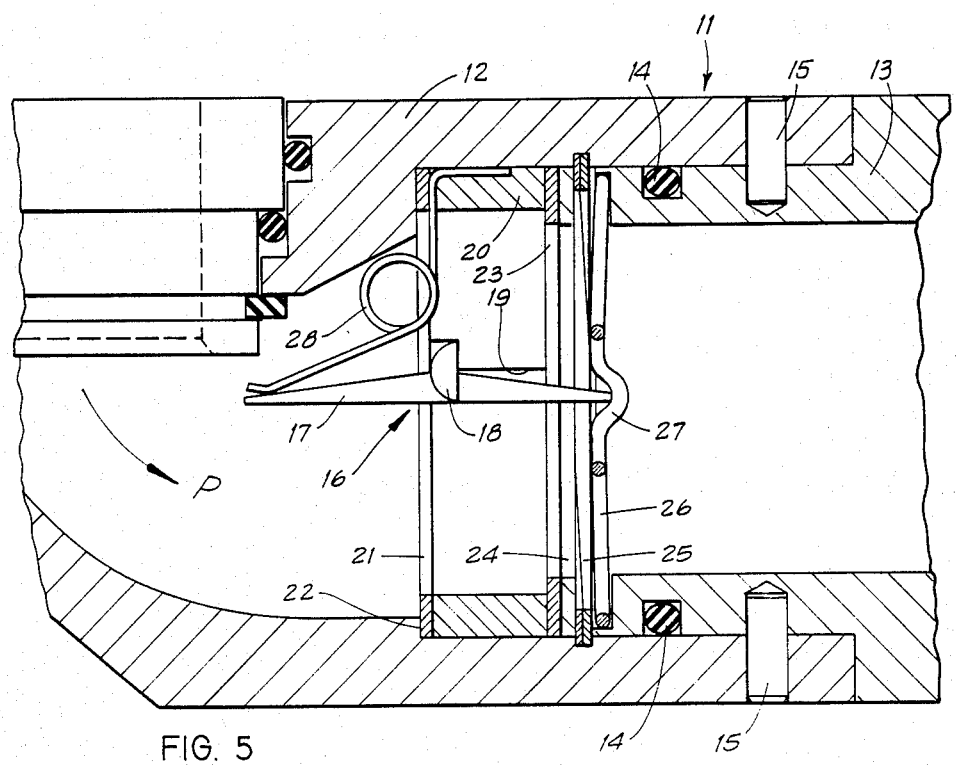

U.S. Patent   May 9, 1989   Sheet 2 of 6   4,828,183
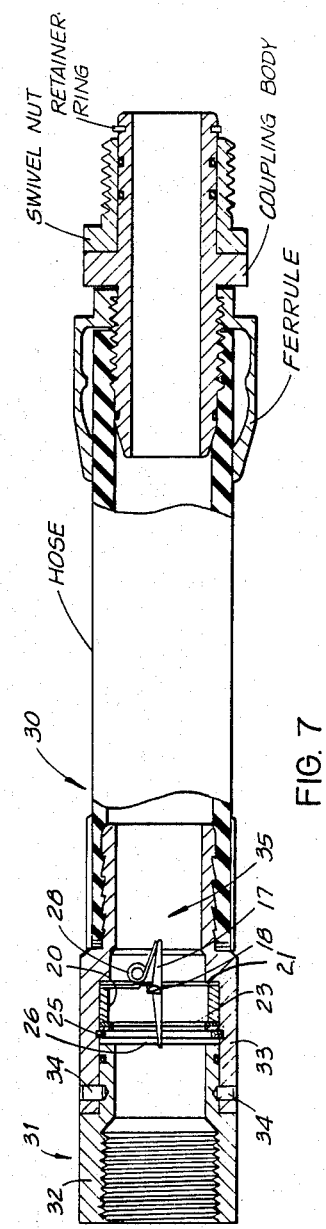
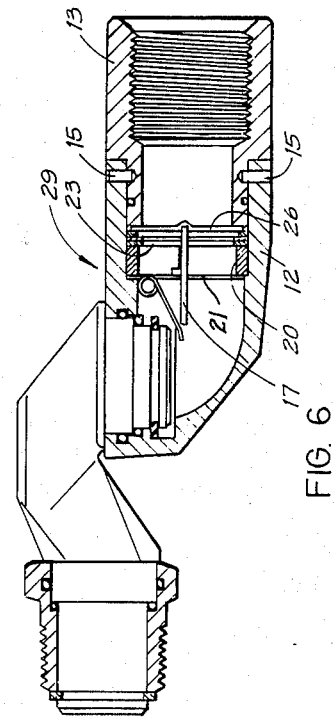

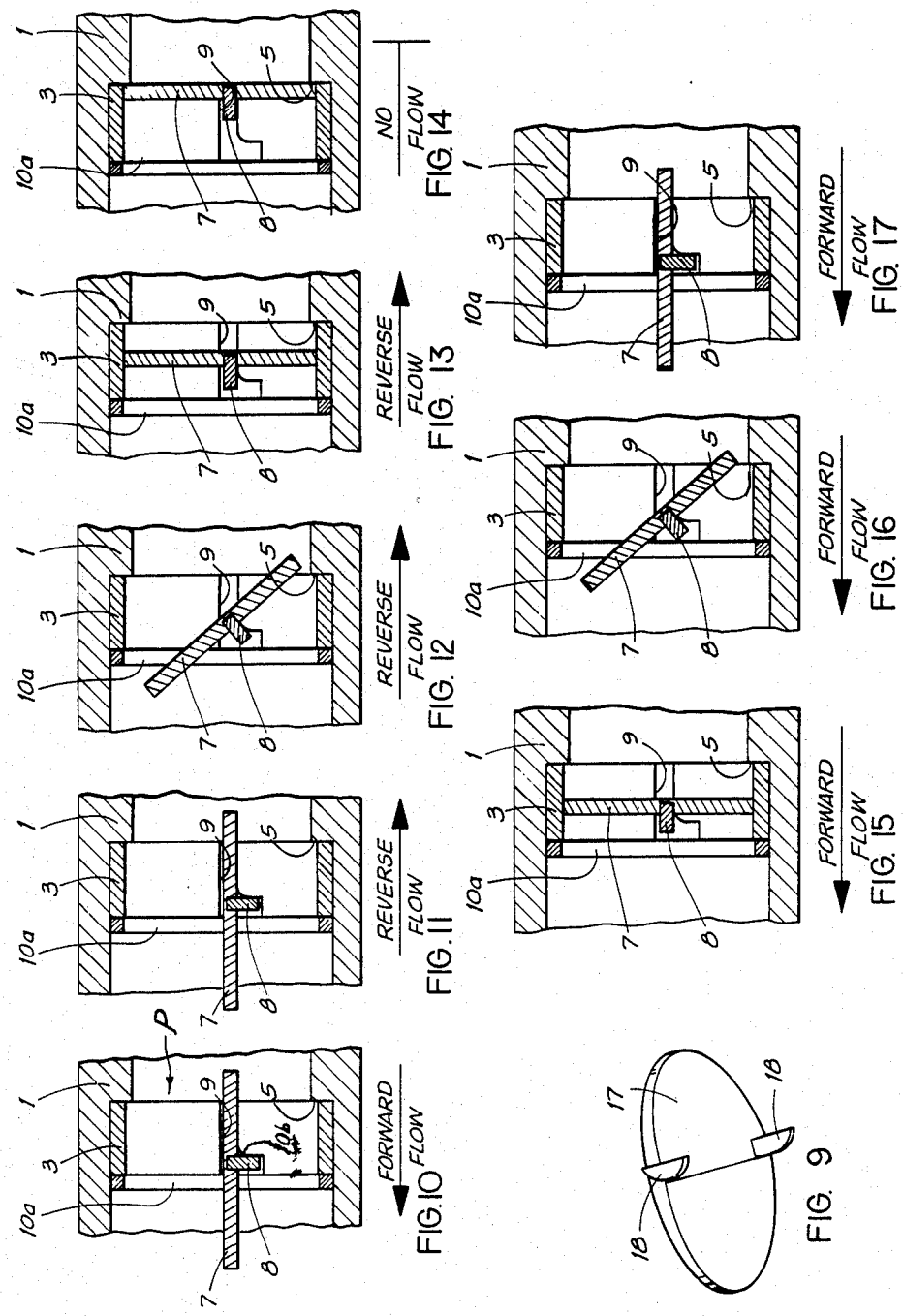

BUTTERFLY VALVE FOR FLUID FLOW LINE

CROSS-REFERENCE TO RELATED APPLICATION

This application is a continuation-in-part of the patent application upon Butterfly Valve for Fluid Flow Line, Ser. No. 682,661, filed on Dec. 17, 1984, which applications are owned by a common assignee.

BACKGROUND OF THE INVENTION

This invention relates generally to means for providing a curtailment of fluid passage through a flow line, and particularly at that instance when a severance occurs in the line, at that moment when a loss of fluid may be encountered, or at a moment when a reversal of flow occurs. The invention is especially important when applied in a fuel line, and functions as a check valve to prevent fuel flow under particular conditions.

There are an infinite number of valve means in he prior art that provide for a shut off of fluid or other fuel flow, and more particularly, such mechanisms normally are utilized in flow lines where fuel may be flowing, and generally in those situations when the conduit comprises the fuel line leading from a gasoline dispenser to its nozzle. For example, as can be seen in the U.S. Pat. No. 4,449,545, a poppet valve having a conical surface is disposed for seating upon a valve seat when breakage occurs between the various body components making up the plug and socket of the shown valve. While the particular unit as shown may be successful for curtailing the discharge of any fluid, or fuel, in the event that the vehicle, as shown therein in its figure should drive off with the dispensing nozzle remaining within its fuel tank, the major problem encountered with this style of break-away safety valve is that the poppet valve forming the conical surface of the valve is quite large in size, and as can be so easily seen, is exceeding obstructive to the normal flow of fuel through its tubular body, as disclosed. This is a feature that is very objectionable with respect to the type of break-away safety valve as disclosed, and as currently available in the art. A recently issued Pat. No. 4,617,975, discloses a tension actuated uncoupler, that fits within a fuel flow line, but which utilizes a series of detent balls and circumferential spring means for holding the coupler together, and which when disconnected, can then be reinserted back into connection for reusage. In addition, the valve means itself comprises a rather distinctly shaped check valve member which apparently slides longitudinally, into closure, when the device is uncoupled. There are a great variety of other types of hose couplers, employed in the art, as can be seen in the U.S. Pat. No. 2,777,716, to Gray, showing a socket type hose coupler with reciprocating detent. Another form of quick disconnect coupler and safety check valve is shown in U.S. Pat. No. 4,060,219, to Crawford. In addition to the foregoing, the patent to Shames, U.S. Pat. No. 4,070,003, also discloses a coupler with automatic shut off, but once again, as can be seen, the sealing means provided therein is of substantial size, and causes significant disruption to the normal flow of fluid through the coupler. In other words, shut off is obtained at the expense of normal and routine fuel flow. Another type of valve assembly is shown in the United States patent to Morrison, U.S. Pat. No. 4,307,744. An additional form of break-away safety valve is shown in the United States patent to Gayle, U.S. Pat. No. 4,064,889, wherein there is incorporated a ball valve which prevents the discharge of gasoline vapors in the event that a break occurs. Another type of disk valve of the foregoing style is the break-away coupling shown in the United States patent to Mount, U.S. Pat. No. 2,906,280, wherein a separation of its coupling means causes a valve head to lineally shift into closure. A related type of device is shown in the safety disconnect valve described in the patent to Tsiguloff, U.S. Pat. No. 2,898,926.

More attuned to the current invention is the breakaway coupling assembly disclosed in U.S. Pat. No. 4,328,822, to Wilhelm, in addition to the U.S. Pat. No. 4,119,111, to Allread. Furthermore, pertinent are U.S. Pat. Nos. 3,921,656 and 4,090,524, relating to dual valved breakaway fittings. These devices incorporate, what would appear to be, flapper type valve means for entering into closure in the event that disconnection or separation should occur.

It is, therefore, the principal object of the current invention to provide a butterfly and related valve in the form of valve means within a hose coupling, particularly useful in the fuel dispensing art, and which butterfly valve(s) are normally aligned the length of the fuel passage, as when maintained in opened condition, disposing their thinnest dimension thereat, so as to cause little or no obstruction to the natural and normal flow of fuel through the line, but on the other hand, when a disconnection occurs, the butterfly valves are urged either by fluid pressure or through spring biasing means to snap actively into closure, preventing any further flow of fuel through the flow line.

Another object of this invention is to provide a butterfly valve, or a pair of such valves, within a coupling means interconnected within a fluid flow line, such as a gasoline fuel line, and which disk of the valve need only pivot approximately a 90° dimension to effect a full and complete closure of the flow line, and to assure an immediate discontinuance in the further passage of fuel therethrough.

Another object of this invention is to provide means for functioning in cooperation with the disk valve of a butterfly valve, and which means acts simultaneously to either hold the valve into its desired open disposition, or to immediately urge it into instantaneous closure as such becomes a necessity.

Yet a further object of this invention is to provide a valve disk mounted to its valve retainer through the agency of particularly designed projections and which naturally tend to motivate the valve into closure upon release of its normally retained disk in the event that a decoupling should occur within the fuel flow line in which the invention mounts.

Still another object of this invention is to provide a pair of such butterfly valves within a fuel dispensing line, and within proximity of its dispensing nozzle, so that should a separation occur, as a result of a vehicle driving off with the dispensing nozzle still inserted within its fuel tank, each butterfly valve will instantly snap into closure, thereby preventing further flow of fuel from the dispenser, and in addition, prevent any backflow of fuel from the nozzle.

Yet another object of this invention is to provide a uniquely positioned valve disk for a butterfly valve and wherein the flow of fluid in one direction causes the valve to move into closure, but yet a movement of the fluid in an opposite direction causes the same valve to immediately open.

In addition, in view of the foregoing, another object of the current invention is to provide a valve or check valve that may have usage in the medical field, as for example for providing a form of valve that may be incorporated into a mechanical heart, or as the replacement of a defective mitral valve in the human heart or other valve in the cardio-vascular system.

Yet another object of this particular invention is to provide a valve, which may also be used as a check valve, and which may be applied for application in various industries, such as in the shipping industry, and marine industry, for preventing further flow of materials in the event that breakage may occur in the conduit utilized for loading or unloading of material from the vehicles or vessels.

Another object of this invention is to provide a check valve to be used in conjunction with a loading conduit, and which may have application in transporting various types of fluids, even in the category of a grain, or other freely moving related materials.

Still another object of this invention is to provide a valve design incorporated in a pipe connection having a fitting on its downstream end and designed to break away upon exposure to a predetermined external force, such action releasing the valve disk to immediately close, and thereby prevent the escape of any fluid therefrom. The closure of the valve may be achieved more forcefully through the assistance of a spring means or the like that normally bias against the valve disk, and immediately urge it into closure as the disk is released from its retaining means.

Still another object of this invention is to provide a butterfly valve for a fuel flow line and which may be incorporated within the swivel connector for a fuel dispensing nozzle.

Yet another object of this invention is to provide a butterfly valve for a breakaway coupling and which may be formed of various material such as steel, polymer, rubber, aluminum, as may be required to meet the specifications for the particular application.

Another aspect of this invention is to provide a butterfly valve means, for use in a break-away coupling assembly, applied in a fuel line, preferably at the location of its nozzle, and which incorporates a plurality of passages, one for the near unobstructed and free flow of fuel from the dispenser to its nozzle, and thence to the vehicle, while a second, and generally concentrically arrange passage provides for the conduct of vapor, in the vapor recovery style of fuel dispensing system.

These and other objects will become more apparent to those skilled in the art upon reviewing the summary of this invention, and upon undertaking a study of the description of its preferred embodiment, in view of the drawings.

SUMMARY OF THE INVENTION

This invention contemplates the formation of a butterfly valve, or a pair of the same, incorporated within a fluid flow line, but more preferably a fuel dispensing flow line, and which functions to provide freedom for the normal flow of fluid through the flow line during its routine dispensing function, but that in the event a tensioning or shearing type force is encountered by the fuel line, then decoupling means severs providing for an instantaneous closure of the butterfly valve(s) to prevent any further flow of fuel from its dispenser. It should be stated at the outset that the application of this particular invention within a fluid flow line is intended to mean that the fluid encompasses not only a liquid such as gasoline, or other fuel, but in addition, may comprehend a fluid in the nature of a gas, or even granular material that exhibit free flowing characteristics when moved under pressure, such as grains, smaller particulate material, or other types of materials that can be subjected to fluid flow. Actually, the butterfly valve of this invention is firmly mounted within a coupling device, and which coupling device may be incorporated within the fuel flow line, or perhaps connected at one end of the fuel line and at its other end with the gas dispenser, so that when disconnection or separation occurs in the coupling device, its normally opened butterfly valve(s) immediately snaps into closure, preventing any further flow of fuel therethrough. In the alternative, it is just as likely that the concept of this invention may be incorporated directly within the swivel means normally connecting with either the fuel dispenser, or perhaps to its operative nozzle, so that as decoupling occurs between the coupling means mounting the butterfly valve, instantaneous curtailment of fuel or fluid flow will be achieved.

More specifically, the coupling means of this invention incorporates a pair of break-away members, such as male and female components that normally connect into closure, and function as a normal conduit for the passage of fluid or fuel therethrough. But, the butterfly valve, and more specifically its valve disk, for this invention is mounted within its valve retainer, within one of the aforesaid components, while the means that normally holds the disk valve into its open position, and which connects into the other separable component of the coupling means, when the holding means is removed from its disk holding position, as when a decoupling occurs, such causes the butterfly, or more specifically its valve disk, to pivot directly into closure upon an accompanying valve seat. Actually, the urging of the disk valve into closure may be caused by the direct pressure of the flowing fluid there against, but in the preferred embodiment, it is desirable that some form of a spring biasing means, such as a wire spring, will be constantly urged upon the disk, and immediately snap it into closure in the event that the disk is released from its holding means, and which occurs when the coupling means separates.

As previously commented, it is also preferred, although not required, that a pair of such butterfly valves may be incorporated within the coupling means of this invention, so that when separation of the coupling means occurs, each butterfly valve will pivot into its own closure, thereby preventing the further flow of fluid through or from the fuel line, and in addition, prevent any backflow of fluid from that segment of the coupling means normally connected downstream therefrom.

In the particular configuration of the butterfly valve for this invention, it is generally held by means of a valve retainer, and which retainer incorporates, or has mounted proximate thereto, the valve seat, which cooperates with the disk of this butterfly valve, and a pair of projections extend from the sides, generally diametrically disposed, but preferable slightly offset therefrom of the said disk, to provide for its pivotal mounting with respect to the said retainer. And, the valve retainer is uniquely designed formed having a pair of grooves, generally longitudinally along the retainer, with a shoulder formed at the upper edge of each groove, so that the disk of the valve when normally maintained open, presents its thinnest dimension in alignment with the flow of fuel through the flow line, with the projections being seated upon these disposed shoulders. But, when the disk is released, as from its holding means, normally which occurs when disconnection of the coupling means is effected, the disk will be disposed for pivoting about its projections, with the projections then becoming aligned into the valve retainer grooves for effecting a pivoting of the disk and its longitudinal shift for seating upon the proximate valve seat. Thus, and to achieve this particular purpose, it is desirable that the projections may be slightly offset mounted with respect to the approximate midpoint of the valve disk, and that such eccentricity normally causes the disk to pivot into its disposition across the fuel passage way, and to be shifted in or under the force of the flowing fuel or by means of the exertion of a supplemental spring means for immediate movement into seating upon its valve seat and effecting instantaneous closure for the fuel flow line. Obviously, the shape of various projections may vary with the design of the butterfly valve, but generally projections being of a length of rectangularly shaped rods, or perhaps semi-circularly shaped rods, have been found effective for producing the desired results as described herein.

The butterfly valve of this invention, which may function also as a check valve, may have application in conduits useful for the transport or delivery of fluid, such as fuel, like gasoline, or other liquid materials, and in addition, various granular material that also experience fluid flow during their transport, such as grains, or related types of material, and likewise, has application as a valve for use in the medical field. And, fluids herein may likewise encompass a gaseous material, such as pipelines transporting natural gas, or the like.

The butterfly valve of this invention, as housed within its break-away assembly, also contemplates its usage for achieving vapor recovery, particularly in those jurisdictions where the collection of fuel fumes and vapor is a requirement. In this particular embodiment, the butterfly valve means, and whether it be of a singular or double style, as to be explained in this application, are conveniently located within the fuel passage line, in the manner as previously described, but also arranged in proximity with the fuel passage line is a vapor passage, which in this particular instance, comprises an outer or concentrically arranged tube, generally of flexible material, as known in the art, and which allows for the recovery of the fuel vapors, as attracted at the nozzle, during fuel dispensing.

BRIEF DESCRIPTION OF THE DRAWINGS

In referring to the drawings, FIG. 1 discloses, schematically, the arrangement of the butterfly valve of this invention, in its opened position, as supported by the valve retaining means;

FIG. 2 discloses, schematically, the pivotal movement of the butterfly valve towards its closure position;

FIG. 3 shows the butterfly valve lineally shifting for approaching closure, being aligned across its retaining means, while moving longitudinally therein;

FIG. 4 discloses the butterfly valve of this invention fully disposed in closure;

FIG. 5 shows, in an enlarged view, the butterfly valve for fuel flow line mounted within an operative coupling means;

FIG. 6 shows the butterfly valve of this invention mounted within a swivel connector generally for use within a fuel dispensing line;

FIG. 7 provides a longitudinal partially sectional view of one of the butterfly valves of this invention mounting within a separable coupling means formed within a segment of a fuel flow line;

FIG. 9 provides a perspective view of the disk valve of this invention;

FIGS. 10 through 17 provide, schematically, a disclosure of the butterfly valve of this invention, showing its disposition from its normally opened position, as until such time when reverse flow moves it into closure, and then activation of forward flow reopens the valve for providing normal flow of fluid through the shown conduit;

DESCRIPTION OF THE PREFERRED EMBODIMENT

Figure 8:
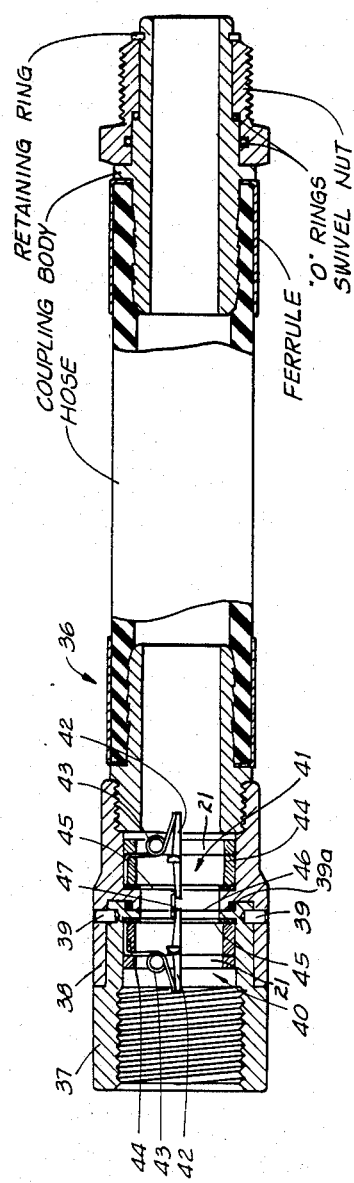
FIG. 8 shows a pair of the butterfly valve means of this invention provided within a hose section of a fuel dispensing line.

The principle behind the butterfly valve of this particular invention can be rather concisely and accurately explained upon viewing the functioning of such a valve when installed within the flow path provided through a fuel or flow line, or the like. In referring to FIGS. 1 through 4, there is shown an example of a segment of a flow line, as at 1, having a passage 2 therethrough and through which the fluid, as for example gasoline, flows during normal usage of the installation, as when it is connected into a fuel dispenser system. In addition, and while a variety of other fluids and related materials, as previously identified, can be transported in installations incorporating the valve of this invention, its primary use is in a gasoline dispensing installation, and also, can be applied in that flow line through which vapor recovery occurs. A valve retainer 3 is mounted rather firmly within the conduit 1, and perhaps may be stabilized in position by securing against an integral shoulder 4 of said conduit. But, such a structural relationship is not absolutely essential, since for reasons to be subsequently described, other means for mounting of the butterfly valve therein may be used. But, in the normal procedure of usage of this invention, it is essential that a valve seat be provided, and in this particular instance, a part of that shoulder 4, as shown at 5, forms a valve seat for seating of the butterfly valve thereon during closure.

The butterfly valve of this invention is shown at 6, and comprises a valve disk 7, as disclosed, and which is mounted for pivotal movement by means of the valve retainer 3, as can be seen. More specifically, the valve disk 7 is essentially circular in configuration, although other shapes, even square or rectangular, may possibly be utilized. The valve disk 7 includes a pair of projections, as at 8, one extending from approximately each side edge of the said disk, generally aligned diametrically across the disk, but preferably slightly off center therefrom, and each projection, which is in the nature of a stem, also extends some distance laterally, as in offset, of the disk dimension, as can be seen. Generally, the exterior or diametrical dimension of the disk 7 is slightly less than the internal diameter of the valve retainer 3, but is greater than the diameter of the valve seat 5, so that when the butterfly valve is pivoted into closure, it firmly seats upon the valve seat 5, so as to afford closure to any passage through the conduit. But, the projections 8 extend some distance laterally from the side edges of the valve disk 7, so as to have an overall dimension greater than the internal diameter of the valve retainer 3, and provide for the proper mounting and seating of the butterfly valve in its operative disposition.

It is to be noted that the valve retainer has a pair of slots, as at 9, provided to either side, and also arranged generally off center, as can be seen, and in alignment with the projections 8, with the upstream edge of the slot being cut and formed having a shoulder, as at 10, as can be seen. The width of the shoulder, in combination with the slot 9, is sufficient to accommodate the length of the projections 8, at either side of the valve retainer 3, so that when the butterfly valve is maintained in its opened disposition, the extended length of each of the projections 8 will rest upon the shoulders 10, and maintain the butterfly valve in its opened configuration, as shown in FIG. 1. As will be subsequently described, other means may be provided for assuring that the butterfly valve, or more specifically the valve disk 7, remains open, under normal operating conditions for the valve. As can be seen in FIG. 2, when the disk valve 7 has been released, and due to the offset or eccentric positioning of the projections 8 extending from either side of the disk 7, the disk valve 7 commences to pivot about the interior corner of the shoulder 10, until such time as its projections 8 become aligned within the respective slots 9, as disclosed in FIG. 3. Then, due to either the continuing fluid pressure, or perhaps bias of any spring urged upon the valve disk 7, the disk 7 will shift within the grooves 9, until such time as it presses against the valve seat 5, thereby urging the butterfly valve into complete closure, and sealing off any further flow of fuel through the passage of the identified conduit 1. It should be commented, although it is probably obvious, that the flow of fuel through the conduit 1 as shown in these FIGS. 1 through 4 would be from the left to the right thereof. Although, should spring pressure be used to push and hold the disk into closure, then the direction of fuel flow becomes normally unimportant.

It can also be seen that there is a washer-like means, as at 10a, provided upon the backside of the valve retainer 3, and which generally seals off the shoulder area 10, so that in the event fluid flow should reverse itself, and move from the right to the left as shown in the FIGS. 1 through 4, the disk valve 7 will move upwardly within the grooves 9, and be urged to repivot, once again, into that aligned position as shown in FIG. 1. This occurs because the projections 8 are offset, or off center, with respect to their mounting to the sides of the disk 7, and in addition, the grooves 9 are likewise somewhat off center in their location, so that when the disk valve 7 and its projections 8 move to the left, in the figures as disclosed, the projections encounter the washer means 10a, and are forced to pivot approximately 90° into their opened disposition.

Having generally described the structure and function of a butterfly valve of this particular design, the practical installation of such a valve into an operating mechanism can be more accurately defined, and understood, upon reviewing the device of FIG. 5. As can be seen, this particular installment of the butterfly valve is in a break-away coupling, generally identified at 11, and which comprises a female component 12 having a male component 13 snugly inserted therein, and forming a fluid tight seal therebetween, as through the arrangement of seal means such as an "O" ring 14, or a tetra seal, quad ring, or the like, with the two components being firmly secured together by means of shear pins 15, which are predesigned to sever, as upon encountering a particular force, such as may occur when tension is exerted upon one or the other of the components 12 or 13.

The butterfly valve of this particular invention is generally shown at 16, and comprises a disk valve 17 having projections 18 extending from either side of the said disk, and in this particular instance, the projections may be fabricated in the semi-circular design, unlike the previously defined projections, so as to facilitate the movement during pivoting of these members into their respective groove 19, as formed diametrically of the valve retainer 20. In this particular instance, the valve retainer 20 is snugly contained within the female component 12, against a washer or other gasket 21, which rests against the integral shoulder 22 formed internally of the component 12, as can be seen. This unique style of butterfly valve incorporating the projections 18, as offset, in their connection with the edges of the disk valve 17, as previously explained, may have their backside fabricated in a semi-circular design, or of arcuate shape, so as to facilitate the movement of the disk valve during its operation. The valve retainer 20 has the valve seat 23 resting thereagainst, and which valve seat has an internal diameter less than the diameter of the valve retainer 20, so that when the disk 17 of the butterfly valve is pivoted into closure, and slides longitudinally the length of the grooves 19, said disk will firmly press and seat against said valve seat, to shut off the passageway P through the installation 11, and prevent any further flow of fluid or fuel therethrough. A washer, or other means 24, may be provided against the valve seat 23, to stabilize it, and a retainer ring 25 mounts within the component 12, so as to assure the retention in place of all of the previously identified components, that make up the butterfly valve 16 of this invention.

As can also be seen, a valve disk holder or hold open member 26 is provided, generally across and proximate the end of the male component 13, and in this position, the component is designed to hold the valve disk 17 into its opened configuration, as during normal usage of the member 11. This particular hold open device may comprise any form of a clip, constructed of a wire, fine rod, or the like, and may have a gooseneck, as at 27, provided therein, and which retains a tip of the valve disk 17 therein, so as to assure its maintenance into its opened configuration, providing for the free flow of fluid therethrough, under normal operating conditions. But, should an excessive force be exerted upon the member 11, as through either of its component 12, or 13, and should the shear pins 15 sever, when the components separate, the hold open clip 26 will be pulled longitudinally away from the valve disk 17, and through the exertion of a spring biasing force, as by means of the steel or other material spring 28, upon the disk 17, it is forced into an immediate pivotal movement and towards closure. And, the sequence of movement of the valve disk 17 is not unlike that which has already been previously explained with respect to the functioning of the butterfly valve as shown in FIGS. 1 through 4.

It should also be noted, and as can be clearly seen herein, that when the butterfly valve, and more specifically its valve disk 17 is arranged into its opened configuration, it presents a very thin line dimension within the passageway, as generally shown at P, through the member 11, providing the least obstruction to normal flow of fluid or fuel through the device, under normal operating conditions. But, when the butterfly valve is urged into closure, as upon separation of the device 11, the valve disk 17 enters into a firm closure, being forced downstream by means of the spring pressure 28, and the fluid pressure urged thereagainst, into that closed position as previously explained with respect to the butterfly valve identified in FIG. 4.

The general description of the butterfly valve of this invention, as just explained with respect to the device as shown in FIG. 5, can be rather easily installed into a workable condition, as for example, as shown in FIG. 6, through its mounting within the swivel connector of the type that is normally used in a fuel flow line for the dispensing of gasoline, or the like. As can be seen, the swivel connector 29, as disclosed, contains very similar components, as identified, to that which has been just described with respect to the embodiment shown and explained in said FIG. 5.

Another usage of the current invention is its application within a hose disconnect, as shown generally at 30, in FIG. 7. But, the function and application of the butterfly valve is similar to that just explained. In this particular installation, the break-away coupling 31 includes a male component 32 snugly contained within the female component 33, and held together through the agency of one or more shear pins, as at 34. The remaining components, or the butterfly valve 35, are identical to that which has been previously explained, and the same components are generally identified, where noted. When break away occurs, as through the exertion of an excessive force that shears the pins 34, the wire or rod retainer 26, releases the valve disk 17, which functions under the exertion of the spring force 28 to pivot about their projections 18 for sliding within the valve retainer 20, or more specifically its grooves, and entering into closure against the valve seat 23, as previously analyzed. This particular coupling can be provided within the hose leading from the gasoline or fuel dispenser, to its dispensing nozzle, and function to provide for disconnect, of its coupling 31, in the event that a significant tensioning force is exerted upon the hose, such as can occur if the nozzle is left within the gasoline tank of an automobile, and the customer drives off.

In addition, the offset projections 18 for this particular valve, as noted in FIG. 7, may likewise be formed in a similar manner to that which is shown in FIG. 5, having the semi-circular backside configuration, so that in the event the valve disk encounters flowing fluid in the opposite direction, as when a recoupling is made, as for example when the invention may be used in other art, as previously explained, the backflow of fluid will urge the disk into a reopened position within the disclosed hose.

Further modification to the break-away coupling of this invention, and comprising an extension upon the technology explained in FIG. 7, includes the provision of a double seal within the break-away coupling of the invention. This is generally shown in FIG. 8, and includes a hose disconnect, as at 36, very similar in construction to that which has been just previously described with respect to the embodiment shown in FIG. 7. In this instance, the components are almost identical, comprising the male disconnect portion 37 and the female component 38, held together by the shear pins 39, under normal operating conditions. But, once again, should excessive force be exerted upon the hose, in a manner as previously analyzed, the pins 39 will shear causing the coupling to disconnect, separating the complemental male and female components 37 and 38, as explained. As can be seen a sealing O-ring, as at 39a, is preferably located at the inner most point of connection between the components 37 and 38, even inwardly of the components inner diameters, and in this manner reduces significantly the separating force caused by the fluid pressure, minimizing its effect upon or at the plane of coupling between these components. The advantages for this particular invention are that when disconnect occurs within the hose, each of the butterfly valves 40 and 41 will immediately snap shut, sealing against their respective valve seats, and cause immediate closure for each now open end of the hoses or other conduits in which the male and female components secure. For example, if this particular hose disconnect is located within a fuel line, such as a dispenser hose leading from a gasoline dispenser, and in proximity and vicinity of the dispenser itself, or where the hose connects therewith, a separation of the disconnect at this location causes an immediate closure of the butterfly valve 40, preventing any further flow of fuel from the dispenser, and likewise, the butterfly valve 41 being immediately closed, prevents any further flow, or backflow, of fuel out of the dispenser hose, to which it connects.

Each of the butterfly valves 40 and 41 are generally constructed in the manner as previously described, with respect to the schematic of the embodiment as previously explained with respect to FIGS. 1 through 4, and as defined with respect to FIG. 5, and in each instance, the valve disks 42 are biased by means of their respective springs 43 into closure, under proper conditions. Each butterfly valve incorporates its valve retainer 44 mounting the valve disk 42 for operation in a manner as previously explained for the disks 7 and 17. And, each disk, when released, will pivot in a direction opposite from each other, and eventually slide longitudinally within their valve retainer grooves for seating against their respective valve seats 45.

In this particular embodiment, the disk holder or hold open clip, as at 46, is provided intermediate or at the juncture between the male and female components 37 and 38, as previously explained, so that when separation of these components occurs, the clip 46 moves away from one or the other of the identified valve disk 42, allowing it to immediately snap into closure, and since the clip 46 incorporates a pivotal member, as at 47, itself, this particular member is designed for also pivoting, or otherwise releasing, the other valve disk 42, so it also can immediately snap into closure. Thus, as previously explained, when the conditions are set for shearing of the pins 39, and the separation of the components 37 and 38, the hold open clip 46, and its mechanism 47, releases the two valve disks 42 for their immediate urging under their respective springs 43 for biasing into closure against their valve seats 45. Thus, closure is provided at both ends of the juncture between the hose disconnect, where decoupling occurs at this location, so that no further flow of fuel is allowed out of either the male component 37, or any hose or other conduit to which it connects, as a result of the action of the valve 40, and in addition, no fuel is allowed to flow past the butterfly valve 41, and which fuel normally would have been flowing through the hose portion 36, and from any supply to which it connects, such as the fuel dispenser, or the like.

As previously explained, the check valve of this invention can be utilized not only for entertaining an immediate closure, in the event that disconnection occurs, as when the holder means holding the valve into its opened position releases the same, with the valve then closing either by spring pressure, or as a result of the pressure of fluid flowing through the conduit and urging the valve disk into seating upon its valve seat. But, on the other hand, due to the unique design this particular invention, when recoupling occurs, and should back flow take place, and particularly in those instances where spring pressure is not designed to be so great as to maintain permanent closure of the valve, such back flow of fluid forces the valve disk into its opened configuration, as previously explained, and allows reuse of the installation. And, as earlier explained, the coupling device of this invention can be used in a myriad of settings, such as in any fluid flow line, as in the category of a gasoline hose, as used in conjunction with a dispenser, or within other fluid flow lines, and has application in the marine industry, or other transport services, for the loading or unloading of other materials, which have fluidic characteristics, such as any other form of liquid, a gas, vapor, or even grain, or perhaps may even have application in the mining industry, for use for check valve purposes. And, as earlier explained, the valve of this particular invention, and particularly where it can repeatedly be urged into closure, and reopening, may have application in the medical field, such as a form of valve for use in a mechanical heart, or for replacement for damaged human heart and circulatory system valves, or related types of devices.

FIG. 9 discloses in a rather perspective view the disk valve 17 of this invention. And, it can be seen how the disk is rather tappered from its central portion to its edges, so that when it is maintained in its opened position, as shown in FIG. 5, it has little resistance to the flow of fluid through the conduit 11. In addition, the projections from the disk, as at 18, are clearly shown being as affixed slightly off from the center of the valve disk 17, and in addition, the extension of the projections, laterally, and aft to one side of the disk, while further incorporating the arcuateness along their backsides, are clearly shown. And, this particular design for the disk valve of this invention, and the utility as a result of its particular configuration, can be more accurately understood in a review of those attributes of this invention when it is incorporated within a conduit that is subject to reverse flows of fluid therethrough, when the butterfly valve of this invention functions as a check valve, which opens when subject to fluid flow in one direction, but is closed under the influence of the flow of fluid, and its pressure, when the fluid flow reverses itself, and moves in an opposite direction.

As an example of the foregoing, and referring to FIGS. 10 through 17, the check valve of this invention is disclosed, incorporating the conduit 1 having a passageway P therethrough, with the valve disk 7 being located therein and held by the retainer means 3 for shifting longitudinally of the conduit 1. A washer means, as at 10a, is likewise disclosed remaining contiguous with one edge of the retainer 3, while a valve seat, as at 5, is provided therein, in the manner as previously explained with respect to the device of FIGS. 1 through 4. In this particular instance, while the valve disk 7 is shown having stemlike projections, as at 8, it is just as likely that the valve disk may be fabricated exactly in the manner as shown in FIG. 9, where it may be tapering at its edges so as to facilitate the flow of fluid through the conduit 1, and likewise, its projections may be formed as that shown at 18, having arcuate backsides, in order to facilitate the movement of the disk valve from its closed position, back into an open position, with the arcuateness of the projections 18 encountering the washer means 10a, and which urges the disk into its open alignment, as shown in FIGS. 10 and 17.

It is also to be noted that the shoulder 10, as formed for accommodating the seating of the projections 8 thereon, may have slight arcuateness, in the form of structural means as at 10b, so as to ease the movement of the projections 8 from their position of seating upon the shoulders 10, and pivoting into alignment within the retainer grooves 9, as the valve moves into a seating closure against the valve seat 5. Or, in the alternative, when reverse flow occurs, the arcuateness 10b of the shoulder 10 facilitates the pivotal movement of the projections 8 from their alignment within the grooves 9, and for making that turn at the upper corner, as noted, as when the valve disk 7 enters into its open alignment, as shown in said FIGS. 10 and 17.

As disclosed in these figures, it can be seen that when forward flow of any fluid through the conduit 1 is occurring, the disk valve 7 in its longitudinal alignment centrally of the passageway P, and offering little or no resistance to the normal flow of fluid therethrough. But, should flow reverse itself, as shown in FIG. 11, then the backflow of fluid pressure begins to act upon the valve disk 7, as shown in FIG. 12, and since the projections 8 are somewhat off center from the diameter in their connection laterally of the said disk, there is a tendency for the disk to commence to pivot into a turn, as shown in FIG. 12, until such time as the projections 8 become into alignment within the retainer grooves 9, as shown in FIG. 13. Then, once the valve disk 7 is urged to the right within the retainer 3, in the manner as shown in FIG. 14, it seats upon the valve seat 5, preventing any further flow of fluid through the conduit 1. And, it may be mentioned that either the valve disk 7, or the valve seat 5, may be polymer coated, or be provided with some other liquid sealing means so as to provide for a complete fluidic seal when the valve disk 7 enters into its seating engagement upon the said valve seat, as disclosed in FIG. 14. But, should the reverse flow of FIGS. 11 through 13 be changed, and a forward flow once again be encountered, as shown in FIG. 15, this forward flow pushes against the backside of the valve disk 7, and urges it, once again, to the left within the conduit 1, until such time as it encounters the washer means 10a, wherein the lateral offsetting of the projections 8 have a tendency to force the valve disk into pivotal movement, as shown in FIG. 16, until such time as the valve disk enters into alignment with the longitudinal axis of the passage P, as shown in FIG. 17. This pivotal movement occurs because, as can be so clearly seen in FIG. 17, the projections 8 are provided slightly to the off center or side of the diameter of the valve disk 7, and in addition, are off set and project laterally from the side edge of the same disk. Thus, due to this off centered positioning of these projections, the valve disk will be slightly over weight to one side, and provide a little additional surface area, as on the left side, than at its right side, as shown in FIG. 17, to provide for that urging into pivotal movement as required to achieve the shifting of the valve disk into either its open or closed positions, and only through the force of fluid alone as it flows in one or the other of directions as shown in these particular figures. Thus, the butterfly valve of this invention, as fabricated in the manner or the valve disk 7, as explained herein, may be something that could be used in conjunction with, as for example, in medical technology such as a form of valve for use in a mechanical heart, and for providing a form of mitral or other cardio-vascular valve in any medical application, and more particularly as a replacement valve in the heart, or the valve can be used for general mechanical and fluid flow checking purposes where the butterfly valve of this type can function as a check valve, as fluid flows in one direction, but readily open as the fluid reverses its flow. In addition, and although the projections 8 as shown in these FIGS. 10 through 17 appear to be rectangular of configuration, it would be highly desirable that they could also be fabricated in the manner as shown for the projections at 18, as disclosed for the disk valve 17 of FIG. 9, since the arcuateness of the back side of each projection as it encounters the washer means 10a aids in the pivotal movement of the disk into its open and longitudinal alignment axially disposed within the flow path P for the conduit 1.

Figure 20:
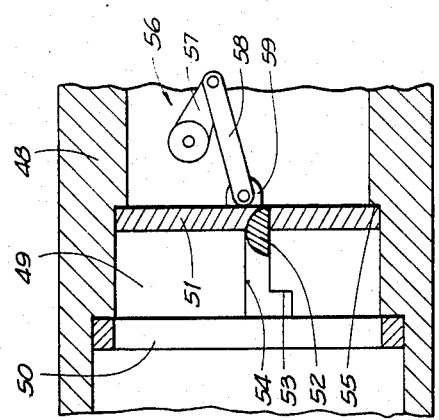
FIGS. 18 through 20 show the butterfly valve of this invention and its being actuated from open to closed position, automatically as during an emergency condition, or which can be manipulated, through the application of manual force through mechanical leverage.
Figure 19:
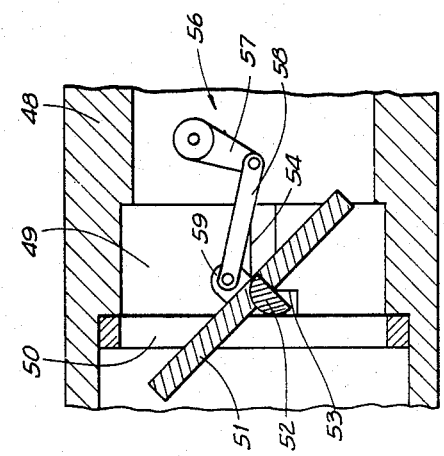
Figure 18:
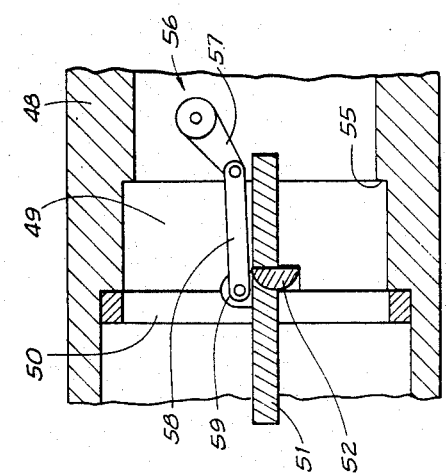

The particular butterfly valve of this invention, as shown in FIGS. 18 through 20, have the further attribute of being used, as for example, as a check valve within those conditions requiring an emergency impact type of safety valve as of the type that may normally be required under a gasoline dispenser as located at a service station. For example, fire and safety codes usually require some type of shut-off valve under a gasoline dispenser so that in the event it is hit by a vehicle, or shifted from position, and should its fuel line break, the checking of any further fuel flow must occur, preventing any fuel from being discharged around the premises of the service station. The butterfly valve of this invention can generally be installed within this fuel line, as disclosed at 48, and incorporate the valve retainer 49 and its washer means 50 having the disk valve 51 and its projections 52 as disclosed. And, the projections 52 are arranged for seating upon the retainer shoulder 53, while the valve is maintained in its normally opened position, as shown in FIG. 18, but that these projections can enter into the grooves 54 in the event that shutoff is required, with the disk valve 51 then seating upon the valve seat 55 and into closure. Under this particular condition, the flow of fluid may normally be from the left to the right, so that when the disk valve 51 will be released from its engagement, such as through the agency of any type of retainer means, such as that shown at 26, as previously explained, the butterfly valve will be urged under the pressure of the fluid or perhaps a spring, to move to the right, through pivoting, and lineal shifting into closure, as shown in FIG. 20. Thus, this particular valve will then function as a shut-off valve, under emergency conditions, and prevent a further flow of fluid, such as gasoline from a supply tank.

A further attribute of this particular invention, as shown and described in FIGS. 18 through 20, is the addition of mechanical means, as at 56, which may be manually or automatically actuated for closing or reopening of the disk valve 51, as required. For example, linkage means 57 and 58 pivotally connect with each other, with the link 58 securing pivotally with the boss 59 connecting upon one side of the disk valve 51. And, the link means 57, connects with a shaft end 58 that extends externally of the conduit 48, and has a handle (not shown) attached thereon, so that upon manual turning of any handle the linkages 57 and 58 will cause the disk valve 51 to shift as desired to reopen the valve 51, from closure, or in the alternative, such manual manipulation of the linkages can be performed for effecting a closure of the valve, as required. For example, at the end of a day, when the service station is to be closed, the serviceman may simply manipulate the handle into manual closure of this main valve for the fuel dispensing system, within the conduit 4 leading from the supply tank, as in the event that the disk valve may not be of the type that can be automatically closed, as when fluid inadvertently flows through said conduit.

Figure 21:
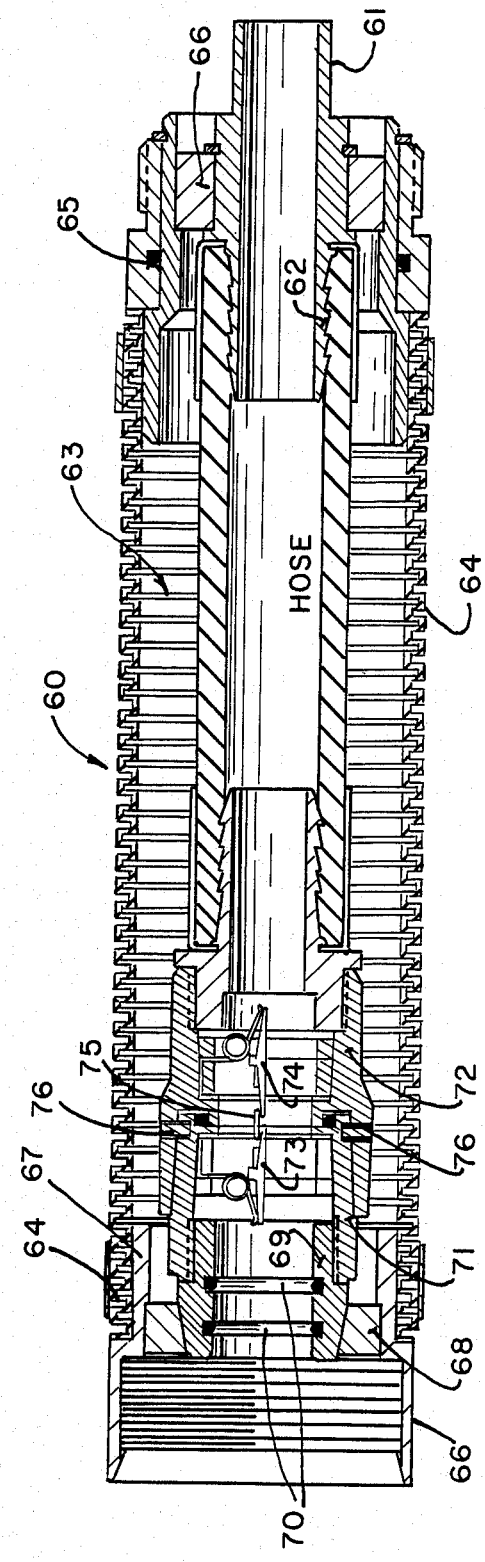
FIG. 21 is a longitudinal sectional view of the butterfly valve assembly of this invention showing the addition of means for attaining vapor recovery.

The butterfly valve of this invention, incorporating the further attribute of achieving and attaining vapor recovery, is shown in FIG. 21. In this particular instance, the assembly 60 includes the hose means, where noted, that provides for passage of fuel from the dispenser to the nozzle, and for distribution into the vehicle, and which further incorporates the coupling body 61, which is designed for mounting with the fuel dispensing nozzle, while the interior portion of the said body, as at 62, is knurled or otherwise ribbed, forming a nipple, and which is designed, as can be noted, for fitting within the proximate end of the hose, which may be fabricated of rubber, polymer, or the like, and be fixed into position for functioning as the fuel line. Surrounding the hose is a second passageway, generally as at 63, and which is generally circumferentially arranged, about the hose, or concentrically located thereat, and which provides this second passageway, but in this particular instance, allowing for the passage of the recovered vapor and fuel fumes. As can be seen, this particular conduit, as at 64, is fabricated as one of the flexible type of tubings, generally fabricated of shaped polymer, and reinforced by having the outer corrugated like covering that adds significantly to the flexibility of the hose, during usage, but yet provides for hermetic seal for retention of the vapors therein, as they are being attracted back from the nozzle to the dispenser during fuel delivery. The one end of the flexible hose 64, and the fuel dispensing hose, as noted, are spacibly fixed with respect to each other, and held together by means of a male hose fitting 65 and through the arrangement of a spacer means, as at 66, which is a form of ribbed or spider type of spacer, and which mounts upon the hose mounting sleeve 61, provides a fixed concentric emplacement between the inner fuel hose, as can be noted, and the outer flexible vapor recovery hose 64. As commented, the member 66 is formed as a spider, having a series of radially arranged spokes, so as to provide for the unencumbered flow of vapors therepast, as being recovered from the proximity of the nozzle, and the fuel tank into which the fuel is being dispensed.

At the opposite end of the assembly 60 there is provided the female component 66, which connects at its forward end, as at 67, with the proximate end of the flexible conduit 64, as can be noted. Internally of the component 66 is another spacer means, as at 68, with said spacer means having a series of radially disposed vanes or ribs, thereby providing an opening between said ribs, to allow for the free passage of the vapors therethrough. The proximate end of any fuel line or hose, as leading from the dispenser, threadedly engages within this component 66, and which line also has the separate passageways for the conduct of fuel into the same, and likewise has mating vapor recovery passages, which communicate with the vapor passage 63, for conveyance of fumes. The spacer means 68 is rigidly fastened to the sleeve means 69, and which includes a series of O-rings, as at 70, to assure interconnection between the dispensing hose end, and this assembly 60. The sleeve 69 further connects with the valve retainer 71, which in turn mounts in retention within the retainer 72. The retainer 71 has its butterfly valve 73 mounted therein, in the manner as previously described in this application, while the retainer 72 has its butterfly valve 74 also mounted therein, and for functioning in the manner as previously described, as for example in the description of the assembly as shown and described in FIG. 8. A hold open clip 75 holds the butterfly valves in their opened condition, when assembled within the flow line, as shown, but that when separation occurs within the hose, the clip 75 becomes free for pivot from its two retained butterfly valves, allowing them to snap into closure, in the manner as previously explained in this application.

In functioning, the assembly 60 is mounted into its operative position, within the fuel line hose, either at the dispenser, or preferably at the nozzle location. The male component 61 secures with the end of the nozzle, thereby aligning the hose passage with the fuel intake port of the nozzle. In addition, the vapor recovery passages of the nozzle are aligned with the vapor passage 63, automatically, when the nozzle is connected to its proximate end of this assembly. In addition, the opposite end of the assembly, as at its component 66, secures with a corresponding male fitting connecting with the adjacent end of the fuel line (not shown). When in this position, the assembly is readily available for routine application for providing both fuel dispensing through it, while at the same time affording vapor recovery attributes. But, when a force is exerted upon the fuel dispensing hose, as when a vehicle drives off with the nozzle still emplaced in its fuel tank, the dispensing hose, and this assembly, is stretched, until such time as the shear pins 76 holding the two retainers 71 and 72 together, succumb to the shearing force, are cut, providing for a separation between these two retainers. When this occurs, the component 66, its spacer 68, the sleeve 69, the retainer 71, and its butterfly valve 73, remain with the fuel dispensing hose, particularly since its component 66 is threadedly engaged therewith, while the other valve retainer 72, its butterfly valve 74, the hose, and the coupler 61, in addition to the retaining ring 65, remain with the nozzle. In any event, when the two butterfly valves 73 and 74 close, when decoupling occurs, the fuel within the dispensing hose line, is blocked from discharge, by means of the closure of the valve 73, while any fuel that may remain within the nozzle, and the hose, as noted, will be blocked from discharge, as through a back flow, by means of the closure of the butterfly valve 74. This has been previously explained. In addition, the vapor hose 64, as previously explained, being mounted upon the component 66, as along its segment 67, and likewise, while the opposite end of the vapor hose is simply mounted upon the retainer 65, as can be seen, one or the other ends of this vapor recovery hose 64 simply slides free of a retention upon the components where noted, to provide for a complete decoupling between the hose 64, and either the component 66, or the retainer 65. Since the shear pins 76 have a fatigue shear value generally somewhere in the vicinity of one hundred, fifty pounds of pressure, the slide mounting of these ends of the vapor conduit 64 upon their means 67 and 65, has a mounting force that is significantly less than that threshold shearing force, meaning that this hose is free to slide clear of one or the other of its mounts 67 or 65, during decoupling.

Variations or modifications to the invention, and its structure thereof, may occur to those skilled in the art upon reviewing the subject matter of this disclosure. Such variations or modifications if within the spirit of this invention are intended to be encompassed within the scope of any claims to patent protection that may issue hereon. The description of the preferred embodiment set forth herein is done so primarily for illustrative purposes only, and is not meant to be interpreted as limiting of the scope of any patent protection that may issue upon this invention.

Having thus described the invention what is claimed and desired to be secured by Letters Patent is:

1. A valve means for application within a fluid flow line, and when maintained in open position, providing for substantially free flow of fluid through said flow line, and when actuated into closed position providing for obstruction of further flow of fluid through said flow line, said fluid flow line comprising a fuel line normally accommodating the flow of fuel therethrough, and a vapor conduit arranged concentrically around the fluid flow line for providing for vapor recovery from the flowing fuel, said valve means comprising at least one butterfly valve means, a coupling means incorporated into the said fuel flow line, said coupling means comprising a break-away coupling of separable parts and contained within the said fuel flow line, and said coupling means containing the said butterfly valve means therein, said butterfly valve means of the valve means including a retainer means, a valve disk mounted for pivotal movement within said retainer means, a valve seat provided within said retainer means and operatively associated with the said valve disk, projections formed extending from each side of the said valve disk, said projections being multiple offset mounted in their extension from each side of the valve disk, said valve retainer having a pair of opposing grooves formed therein, said retainer means at the entrance to each groove having a shoulder formed thereat, whereby the valve disk projections resting upon the shoulders during normal fuel flow, and the projections entering into said grooves to attain closure of the valve disk upon its valve seat, means holding said valve disk into its opened position during normal fuel flow, and means for releasing said valve disk from said holding means as when said break-away coupling separates thereby urging the said valve disk into its sealing closure against its respective valve seat, that means holding said valve disk into its opened position comprising a stop means, means biasing said valve disk into closure, said means comprising a spring-like means, whereupon release of said valve disk during separation of the coupling means effecting a biasing of said valve disk into closure against its respective valve seat, a pair of mounting components, one of said components mounted at each end of the fuel flow line, said vapor recovery conduit at each end mounting onto the said mounting components, and said vapor recovery line capable of disconnection from at least one of said mounting components during decoupling of said coupling means, one of said mounting components being supported by a spider type spacer securing upon and encircling the valve means retainer means, and capable of allowing the passage of fuel vapors therethrough during normal installation of the coupling within a fuel line and while conducting the separate fuel and vapors through their respective flow line and conduit, and said mounting component and its associated spacer means, and retainer means, and butterfly valve being separable from the fuel flow line and the vapor conduit upon separation of the break-away coupling.

2. The invention of claim 1 and wherein there are a pair of butterfly valves incorporated within the valve means of the invention.

3. The invention of claim 2 and including a fuel dispensing nozzle in fluid communication with said fuel line, and said coupling means securing to said fuel line at one end, and to the dispensing nozzle at its other end, said fuel line operatively associated with a fuel dispensing pump.

4. The invention of claim 2 and wherein said fuel flow line including a fuel dispensing nozzle in fluid communication with said fuel line, and said coupling means securing to said fuel line at one end, and to the dispensing nozzle at the other end, one of said butterfly valves incorporated within that separate part of the coupling means remaining with the fuel line, to prevent further passage of fuel therefrom, and the other butterfly valve incorporated within the separate part of the coupling means remaining with the dispensing nozzle to prevent the back flow of any fuel therefrom.

5. The invention of claim 4 and including said valve means incorporating a pair of valve seats, and each butterfly valve disposed for sealing upon a valve seat to prevent the flow of fuel therepast.

6. The invention of claim 5 and wherein each butterfly valve capable of pivoting into closure, and each butterfly valve pivoting in an opposite direction from the other.

7. The invention of claim 1 and including at least one shear pin connecting between the separate parts of the coupling means, whereby said pin severing upon application of a tension force to the fuel line and causing disconnection of its said parts, and thereby effecting closure of said butterfly valve to substantially prevent the flow of fuel therefrom.

8. The invention of claim 7 and including said coupling means being separable, said separable coupling means formed of male and female parts, said male part fitting within said female part to form said coupling, and said shear pin holding said parts together.

9. The invention of claim 8 and wherein said connecting means comprising at least one shear pin, said pin capable of severing upon exposure of the coupling to a force, in excess of a predetermined amount to allow disconnection of the coupling means.

10. The invention of claim 9 and wherein said connection between the male and female parts being formed as a fluid tight seal.

11. The invention of claim 10 and including a seal means provided between the male and female parts to form said fluid tight seal.

12. The invention of claim 1 and wherein said projections incorporate arcuate surfaces to aid the shifting of the valve disk into a reopened condition.

13. The invention of claim 12 and including a seal means provided between the separable parts of the coupling means and forming a fluid tight seal thereat, said seal means being located at the proximate innermost location of connection between said separable coupling to minimize the effects of fluid pressure upon said interconnection.

14. The invention of claim 13 and wherein said seal means comprises an O-ring.

15. The invention of claim 14 and including a hose means connecting with said coupling means, and a nut means connecting with said hose means.

16. The invention of claim 15 and where said nut means comprising a swivel nut means.

17. The invention of claim 2, and wherein each butterfly valve incorporating a retainer means, each retainer means having a valve disk mounted therein for pivotal movement, one of said retainer means and its pivotally mounted valve disk securing to an end of the fuel flow line, the other retaining means and its pivotally mounted valve disk being separably connected to said first retaining means, and capable of separation therefrom in formation of the break-away coupling means, said second retainer means and its valve disk forming the butterfly valve securing with one of the mounting components so as to provide for its separation from the first butterfly valve means, and its connected fuel flow line and vapor conduit separation of the break-away coupling.

* * * * *